Sept. 30, 1924.
O. W. BRENIZER
CABLE SUPPORT
Filed Aug. 13, 1920
1,510,085
2 Sheets-Sheet 1
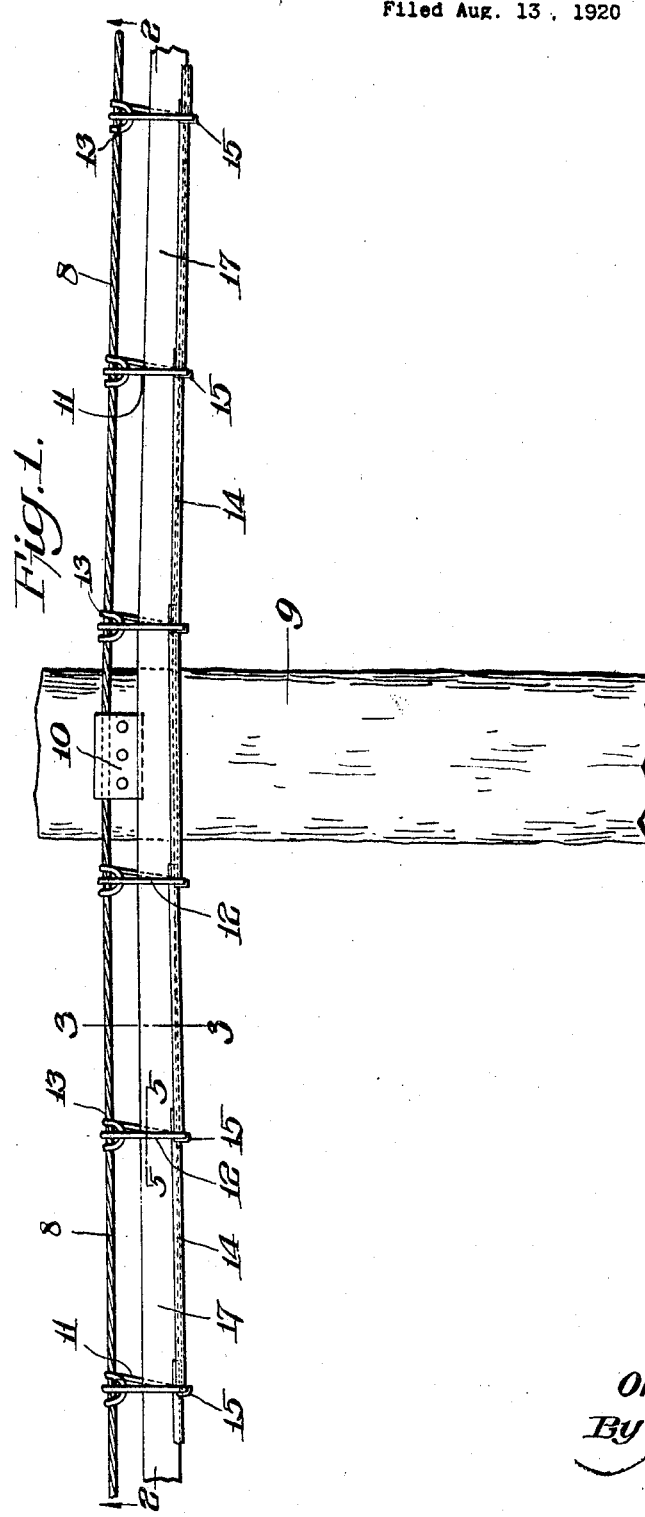
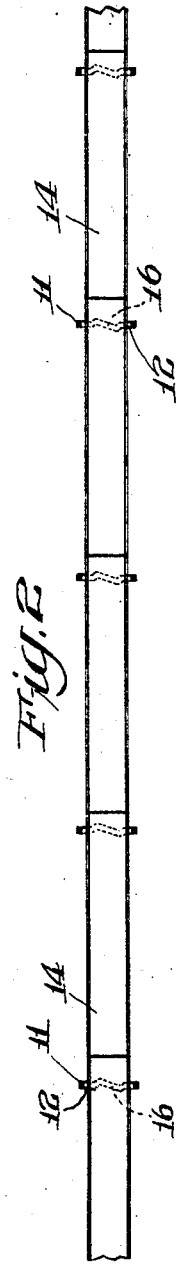
Inventor
Orson W. Brenizer,
By
Attorney Sept. 30, 1924.
O. W. BRENIZER
CABLE SUPPORT
Filed Aug. 13, 1920
1,510,085
2 Sheets-Sheet 2
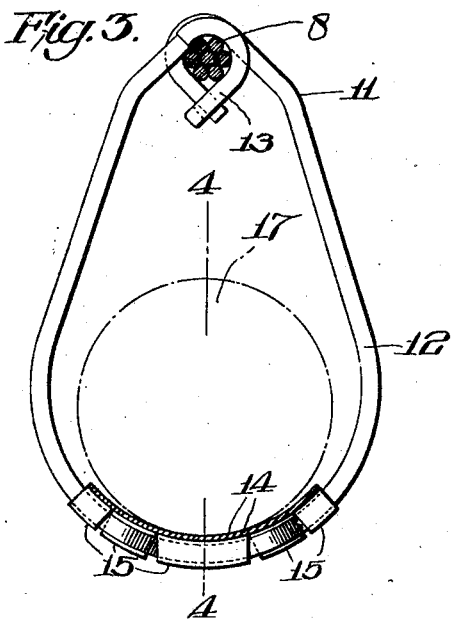
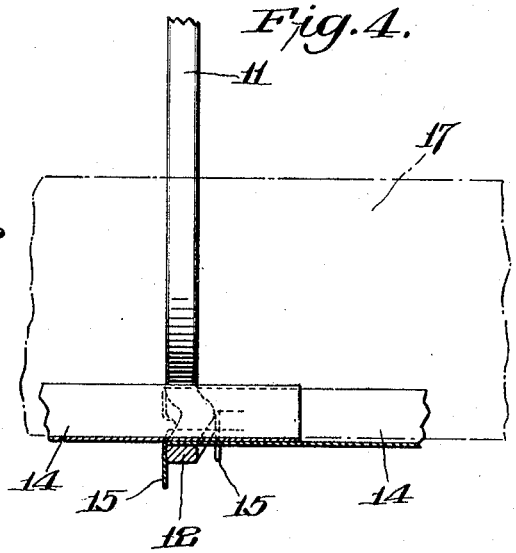
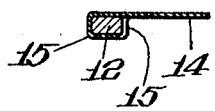
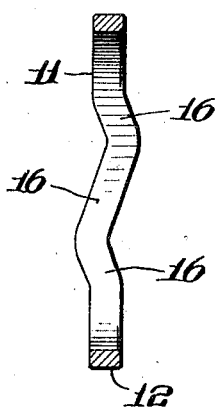
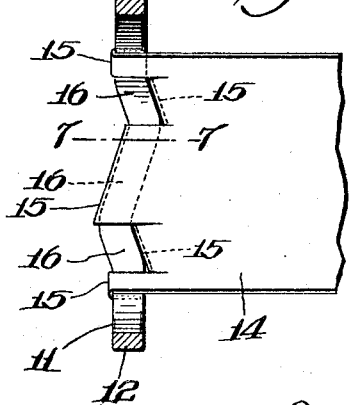
Inventor
Orson W. Brenizer,
By
Attorney Patented Sept. 30, 1924.

1,510,085

UNITED STATES PATENT OFFICE.

ORSON W. BRENIZER, OF PHILADELPHIA, PENNSYLVANIA, ASSIGNOR OF ONE-FOURTH TO ANDREW V. GROUPE, OF PHILADELPHIA, PENNSYLVANIA.

CABLE SUPPORT.

Application filed August 13, 1920. Serial No. 403,196.

*To all whom it may concern:*

Be it known that I, ORSON W. BRENIZER, a citizen of the United States, residing at Philadelphia, in the county of Philadelphia and State of Pennsylvania, have invented certain new and useful Improvements in Cable Supports, of which the following is a specification.

This invention relates to improvements in cable supports wherein spaced hangers are suspended at intervals upon a messenger wire for receiving and supporting a cable and wherein the messenger wire is supported at suitably spaced points throughout its length.

The hangers in general use in cable supports are formed of wire and afford very narrow or limited bearing surfaces for the cable suspended thereby, and this has resulted in deterioration of the cable at points where it rests upon the hangers and particularly where the cable rests upon the hangers in the regions of the supports for the messenger wire carrying the hangers where the greatest strain occurs due to the natural sagging of the wire and the cable supported by the hangers thereon between the poles or points of support of the messenger wire, because the hangers have cut through the lead sheathing of the cable and the insulating material on the wires therein.

The present invention aims to lessen or to substantially eliminate the deterioration of the cable due to the causes above set forth by the provision of an improved cable support of novel construction for that purpose, and the invention consists in the novel construction, combination and arrangement of the parts of the improved support as will be hereinafter described and claimed.

In the accompanying drawings illustrating the invention,

Figure 1 is an elevation of a cable support embodying my invention and showing a cable supported thereby.

Figure 2 is a longitudinal horizontal section through the hangers of the support, on line 2—2 of Fig. 1, omitting the cable.

Figure 3 is a transverse section of the support, enlarged, on line 3—3 of Fig. 1.

Figure 4 is a sectional detail of a part of a hanger and a supporting plate, on line 4—4 of Fig. 3, showing the condition of the lugs of the plate before they are clinched around the hanger.

Figure 5 is a horizontal section through one of the hangers, on line 5—5 of Fig. 1.

Figure 6 is a view similar to Fig. 5, showing the end portion of a plate attached to the hanger.

Figure 7 is a sectional detail, on line 7—7 of Fig. 6, showing the manner of clinching the lugs of the plate around the bottom of the hanger.

Referring to the drawings, 8 designates a portion of messenger wire which is supported at suitably spaced points throughout its length by poles or other means. In the drawings, I have shown a part of a pole 9 for supporting the messenger wire 8 at one point, and the usual bracket 10 for connecting the wire 8 to the pole 9.

Suspended from the messenger wire 8 at suitably spaced points or intervals are hangers 11 each of which is provided with a cable receiving loop 12 and means 13 for attaching it to the messenger wire 8. The hangers 11, as thus far described, may be of any approved type; and I have illustrated herein the means disclosed in my patent application, Serial No. 223,269, as the means 13 for attaching the hangers 11 to the messenger wire 8.

Extending between and into the loops 12 of each two adjacent hangers 11 is a bearing plate 14 which is curved in cross section, as shown in Fig. 3, to conform to the shape of the loops 12. One end portion of each plate 14 is attached to the loop 12 of a hanger 11 and the other end portion thereof enters the loop 12 of the next adjacent hanger 11 and overlaps and rests upon the end portion of the plate 14 which is attached to the loop of the said next adjacent hanger.

The means herein illustrated for attaching each plate 14 to its hanger 11 comprises lugs 15 cut from the body of the plate 14 and bent to extend downwardly and to engage opposite faces of the hanger 11, as shown in Fig. 4, and serve to prevent longitudinal displacement of the plate 14 relatively to the hanger 11 to which it is attached. The lugs 15 may be clinched around the bottom of the hanger 11, as shown in Fig. 7, and this serves to prevent upward displacement of the plate 14 relatively to the hanger to which it is attached.

To prevent lateral displacement of the plates 14 relatively to the hangers 11, I provide that portion of the loop 12 of each hanger which receives the plates 14 with shoulder portions 16 adapted to be engaged by the lugs 15 of the plates 14 for this purpose. The shoulder portions 16 are formed by bending the lower portion of the loops 12 in a manner to produce waves therein, as clearly shown in Figs. 5 and 6. The waves in the loop 12 of each hanger 11 which produce the shoulder portions 16 thereof are formed so as to present shoulders 16 in exactly the same positions to the plates 14 both before and after the reversal of the two sides of the hanger 11, and the lugs 15 of each plate bear the same relationship to the body thereof, so that, in applying the hangers 11 to the messenger wire 8, it will not be necessary to exercise care to have a particular side of a hanger on a particular side of the messenger wire, because the shoulders 16 will all be presented in the same relation to the messenger wire 8 and the plates 14 irrespective of the manner in which the hangers are applied to the messenger wire. Likewise, the plates 14 may be reversed so that their free end portions will extend in the opposite direction; and, when so reversed, their lugs 15 will fit the shoulders 16 without reversing the hangers 11.

It will now be understood that the hangers 11 may be applied to the messenger wire 8 in any manner in suitably spaced relationship and that when thus applied the plates 14 may be readily applied to the hangers 11 with the free end portions of the plates extending in either direction longitudinally of the messenger wire from the hangers 11 to which they are attached.

After the hangers 11 have been applied to the messenger wire 8 and the plates 14 have been applied to the hangers 11, the cable 17 is drawn through the loops 12 of the hangers 11 in the usual manner and over the plates 14 therein and in the direction in which the plates 14 extend from the hangers 11 to which they are attached.

The hangers 11 are formed of wire, galvanized as usual, and the plates 14 are formed of any suitable metal, such as galvanized iron or zinc, preferably the latter.

The smooth and uninterrupted free end portion of each plate 14 overlapping that portion of a plate which is attached to a hanger and which is interrupted by cut out portions from which the lugs 15 are formed receives the cable, provides a desirable bearing therefor, and protects it from the uneven portions of the plates 14 where they are attached to the hangers 11.

By overlapping the end portions of the plates 14 in the direction in which the cable 17 is drawn through the hangers 11, I provide a construction in which no shoulder portions of the cable support are presented to the cable in opposition thereto as it is drawn through the hangers, thereby not only lessening the friction and reducing the power necessary to draw the cable through the hangers, but also lessening the wear upon the cable during the drawing operation.

The fact that each plate 14 is attached at one end to a hanger 11 and rests freely within a hanger at its other end permits independent relative movement among the hangers 11, within limits, without buckling or bending the plates 14.

I am aware that saddles have been placed within the loops of hangers to support the cable therein, but great difficulty has been experienced in holding the saddles in place. Among the important features of my invention to which I broadly lay claim is the provision of a shoulder portion on a hanger to engage a part of a cable supporting plate to prevent displacement of the plate relatively to the hanger laterally of the cable.

I claim as my invention:

1. A cable support comprising a messenger wire, two spaced hangers connected thereto and depending therefrom and provided with means to prevent longitudinal displacement thereof relatively to the messenger wire, each hanger being provided with a loop adapted to receive and confine a cable therein, and a cable receiving and supporting plate extending between and supported by said hangers within the said loops thereof and provided with means to prevent displacement thereof relatively to one of said hangers.

2. A cable support comprising a messenger wire, two spaced hangers connected thereto and depending therefrom, each hanger being provided with a cable receiving loop, and a cable receiving and supporting plate extending between and supported by said hangers within the said loops thereof, said plate being free to move longitudinally within one hanger and being provided with means to prevent longitudinal movement thereof within the other hanger.

3. A cable support comprising a messenger wire, a hanger connected thereto and depending therefrom and provided with a cable receiving loop, a cable receiving and supporting plate having one end portion entering and supported by said loop, said hanger and said plate having co-operating parts preventing longitudinal displacement of the plate relatively to the hanger, and means spaced from said hanger and supporting the opposite end portion of said plate.

4. A cable support comprising a messenger wire, a hanger connected thereto and depending therefrom and provided with a cable receiving loop, a cable receiving and supporting plate having one end portion entering and supported by said loop, said hanger and said plate having co-operating parts preventing lateral displacement of the plate relatively to the hanger, and means spaced from said hanger and supporting the opposite end portion of said plate.

5. A cable support comprising a messenger wire, a hanger connected thereto and depending therefrom and provided with a cable receiving loop, a cable receiving and supporting plate having one end portion entering and supported by said loop, said plate having downwardly extending lugs adapted to engage opposite faces of the hanger and prevent longitudinal displacement of the plate relatively to the hanger, and means spaced from said hanger and supporting the opposite end portion of said plate.

6. A cable support comprising a messenger wire, a hanger connected thereto and depending therefrom and provided with a cable receiving loop, a cable receiving and supporting plate having one end portion entering and supported by said loop, said plate having downwardly extending lugs adapted to engage opposite faces of the hanger and prevent longitudinal displacement of the plate relatively to the hanger, one of said lugs being clinched around the bottom of the hanger to prevent upward displacement of the plate, and means spaced from said hanger and supporting the opposite end portion of said plate.

7. A cable support comprising a messenger wire, a plurality of spaced hangers connected thereto and depending therefrom and provided with means to prevent longitudinal displacement thereof relatively to the messenger wire, each hanger being provided with a loop adapted to receive and confine a cable therein, and a plurality of cable receiving and supporting plates supported by said hangers within the loops thereof, said plates having overlapping end portions, and each plate crossing a space between two adjacent hangers.

8. A cable support comprising a messenger wire, a plurality of spaced hangers connected thereto and depending therefrom, each hanger being provided with a cable receiving loop, a plurality of cable receiving and supporting plates supported by said hangers within the loops thereof, each plate having one of its end portions secured to a hanger and its opposite end portion free to move longitudinally within a hanger to which another plate is secured.

9. A cable hanger formed of a single piece of wire and comprising a central cable receiving loop and means for connecting the respective end portions of the loop to a messenger wire and preventing longitudinal movement of the hanger relatively to the messenger wire, and a cable receiving and supporting plate supported by the hanger within the loop thereof, said loop having bent portion forming a shoulder, and said plate having a part adapted to engage said shoulder and prevent lateral displacement of the plate relatively to the hanger.

10. A cable hanger provided with a cable receiving loop and means for connecting the hanger to a messenger wire, and a cable receiving and supporting plate supported by the hanger within the loop thereof, said loop having a shoulder formed thereon, and said plate having downwardly extending lugs embracing said loop adjacent to said shoulder, one of said lugs being adapted to engage said shoulder and prevent lateral displacement of the plate relatively to the hanger.

In testimony whereof I affix my signature hereto.

ORSON W. BRENIZER.